Dec. 31, 1946.                R. L. SNYDER                2,413,589
ROTARY INTERNAL-COMBUSTION ENGINE (ALTERNATING PISTON TYPE)
Filed Aug. 5, 1943                    5 Sheets-Sheet 1

Inventor
Richard L. Snyder
By
J. L. Whittaker
Attorney

Dec. 31, 1946.  R. L. SNYDER  2,413,589
ROTARY INTERNAL-COMBUSTION ENGINE (ALTERNATING PISTON TYPE)
Filed Aug. 5, 1943  5 Sheets-Sheet 2

Inventor
Richard L. Snyder
By J. L. Whittaker
Attorney

Dec. 31, 1946.                R. L. SNYDER                    2,413,589
          ROTARY INTERNAL-COMBUSTION ENGINE (ALTERNATING PISTON TYPE)
                  Filed Aug. 5, 1943            5 Sheets-Sheet 3
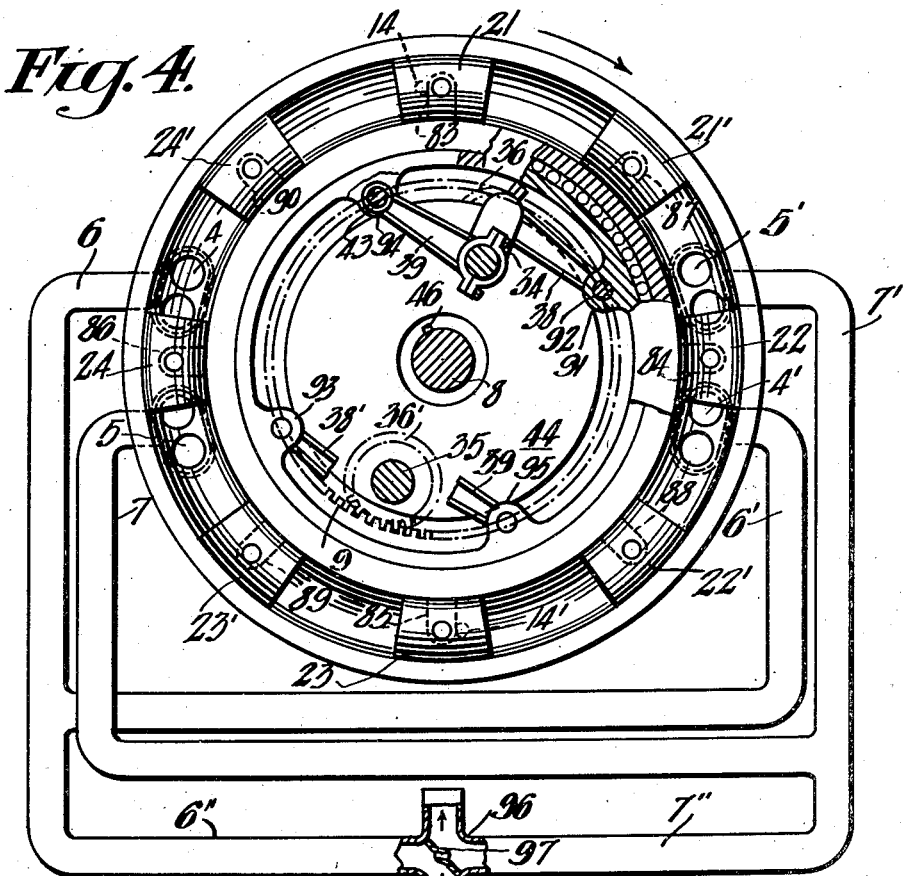
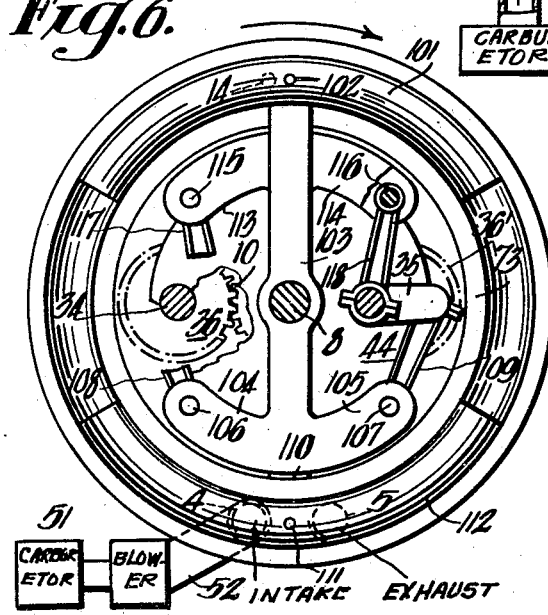
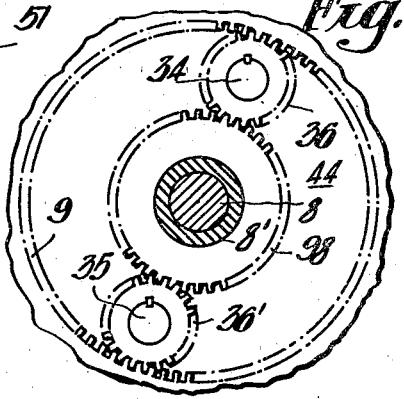
Inventor
Richard L. Snyder
By J. L. Whittaker
Attorney Dec. 31, 1946.　　　R. L. SNYDER　　　2,413,589
ROTARY INTERNAL-COMBUSTION ENGINE (ALTERNATING PISTON TYPE)
Filed Aug. 5, 1943　　　5 Sheets-Sheet 4

Inventor
Richard L. Snyder
By J. L. Whittaker
Attorney

Dec. 31, 1946.  R. L. SNYDER  2,413,589
ROTARY INTERNAL-COMBUSTION ENGINE (ALTERNATING PISTON TYPE)
Filed Aug. 5, 1943  5 Sheets-Sheet 5

Inventor
Richard L. Snyder
By J. L. Whittaker
Attorney

Patented Dec. 31, 1946

2,413,589

UNITED STATES PATENT OFFICE 2,413,589

ROTARY INTERNAL-COMBUSTION ENGINE
(ALTERNATING PISTON TYPE)

Richard L. Snyder, Glassboro, N. J., assignor of one-fourth to Henrietta B. Snyder, Glassboro, one-fourth to Richard L. Snyder, Jr., Princeton, and one-fourth to Christopher L. Snyder, Metuchen, N. J.

Application August 5, 1943, Serial No. 497,420

13 Claims. (Cl. 123—11)

This invention relates generally to internal combustion engines and more particularly to valveless internal combustion engines having at least one continuous toroidal cylinder cavity including therein at least one pair of double ended arcuate pistons disposed in mutually cooperative rotary reciprocative relation.

The various embodiments of the invention to be described in detail hereinafter utilize relative reciprocative motion of double ended pistons combined with absolute rotary motion of said pistons for transmitting rotary motion to a drive shaft. Power is transmitted through a translating system, comprising connecting rods journalled to said pistons and to a conventional crank shaft, and crank means secured to the drive shaft and journaled to said crank shaft. In operation, each "cylinder" comprises the space intermediate adjacent ends of any two of the double-ended pistons within the continuous toroidal cylinder cavity. An explosive mixture is introduced into the space intermediate the ends of each of the two pistons progressing past one or more fixed valveless intake ports, the mixture is then subjected to compression, and the compressed mixture is next subjected to an ignition device which explodes the compressed gas. The exploded mixture delivers power which drives the particular pair of pistons in relative opposite directions, thereby providing reciprocative piston motion with resultant rotary motion of the drive shaft. As the rotary reciprocative motion of the pistons again moves the adjacent faces thereof toward each other, the rotary motion of the pistons brings the space intermediate said pistons adjacent one or more fixed valveless exhaust ports which exhaust the exploded gases due to the compression thereof by the pistons. Further rotary reciprocative motion of this pair of pistons again brings the space intermediate said pistons opposite the fixed valveless intake ports described heretofore. It will be seen that the operation described provides a conventional four-cycle system in which the same cycles are repeated by each adjacent "cylinder" intermediate successive adjacent ends of each pair of double-ended arcuate pistons.

In actual practice, the valveless four-cycle internal combustion engine, described generally heretofore, may comprise at least one continuous toroidal cylinder having a continuous slot on the internal face thereof for accommodating a plurality of connecting rods which transmit the rotary reciprocative motion of the arcuate double-ended pistons within the cylinder cavity to the motion transmitting components for deriving continuous rotary motion of the drive shaft. The drive shaft preferably should be disposed normal to the planes of the cylinder cavities on the central axis thereof. Connecting rods each attached to at least one of the double-ended arcuate pistons are journaled or "floated" upon the drive shaft. A double ring type bearing, including apertures for the connecting rods, is disposed adjacent the internal slot in the cylinder cavity to provide an effective gas seal for the cylinder cavity and also to provide a bearing for the rotary reciprocative connecting rods. A plurality of crank shafts are disposed with their axes substantially parallel with the axis of the main drive shaft intermediate the drive shaft and the inner slotted edge of the toroidal cylinder cavity. The offset portions of the crank shafts are coupled to the main connecting rods by means of short auxiliary connecting rods journaled thereto. The axial portions of the crank shafts are journaled to cylindrical cranks disposed upon and secured to the main drive shaft. The cylindrical cranks comprise heavy disks keyed to the main drive shaft and having bearings adjacent the periphery thereof to receive the crank shafts. The ends of each of the crank shafts include pinion gears which mesh with complementary gears fixedly disposed with respect to the toroidal cylinder cavity.

It will be seen that relatively reciprocative motion of two adjacent arcuate pistons will provide rotation of the offset crank shaft, which in turn will cause the pinion gear secured to the crank shaft to rotate around the complementary fixed gear which is stationary with respect to the toroidal cylinder cavity. The resultant rotation of the pinion gear with respect to the cylinder cavity provides rotation of the main drive shaft through the cylindrical crank means journaled to the crank shaft. The cylindrical crank means may have relatively high inertia, thereby providing an effective flywheel for improving the rotary component of the drive system.

It also will be seen that the rotary motion provided by the rotary movement of the pinion gear about its complementary fixed gear will provide rotary movement of the particular pair of double-ended pistons, since the connecting rods attached to each of the pistons necessarily must follow the rotary movement of the offset crank shaft concentrically with the centrally located main drive shaft.

Intake and exhaust valves are unnecessary, since each pair of adjacently disposed pistons is moved in proper relation with the intake and exhaust ports by means of the rotary motion transmitted to the pistons by the circular movement of the crank shafts about the center main drive shaft. The pistons preferably include conventional piston rings to provide an effective gas seal between adjacent "cylinders." Timing of the relative positions of the pistons, with respect to the intake and exhaust ports and the ignition means, may be accomplished by adjusting the angular position of the fixed complementary gear with respect to the toroidal cylinder cavity. When the pistons have been properly timed, there should be little occasion to again adjust the position of the relatively fixed gear. Ignition timing may be accomplished by means of a conventional cam-contact device operated by the rotary motion of the main drive shaft.

The four-cycle engine may include any desired multiple of two pairs of double-ended arcuate pistons in each of the continuous toroidal cylinder cavities. Furthermore, any number of toroidal cylinder cavities may be disposed in parallel planes normal to the central drive shaft. Also, the same or different crank shafts and cylindrical crank means may be employed with each of the parallel disposed cylinder cavities. Corresponding "cylinders" in each of the parallel disposed cylinder cavities may be fired simultaneously or alternately. The latter arrangement may be accomplished by timing the pistons in adjacent cylinder cavities intermediate the positions of the pistons in the adjacent cylinder cavity, and by firing the "cylinders" in adjacent cylinder cavities alternately.

Conventional carburetor means may be employed for introducing an explosive mixture into the spaces in the cylinder cavity intermediate each two of the arcuate double-ended pistons adjacent the intake ports. Furthermore, forced charging of the "cylinders" may be accomplished by providing reinforced gas pressure means for introducing the explosive mixture into the cylinder cavity. Likewise, the exhausting of the exploded mixture may be facilitated by introducing air under pressure into the cylinder cavity adjacent the exhaust ports. Such scavenging may be accomplished without the necessity of scavenging air control valves, since the particularly adjacent pistons may open a scavenging port at the same or a slightly later instant than they open the exhaust port or ports.

Any conventional type of ignition means such as spark plugs or low potential glow plugs, may be employed for exploding the compressed explosive mixture.

Furthermore, the engines to be described in detail hereinafter are ideally adapted to Diesel operation in which the separate ignition means is omitted. It should be understood that when the engines are employed for Diesel operation, the fuel must be introduced under pressure, and that the overall compression of the explosive mixture must be sufficient to provide self-combustion of the mixture at the point of maximum compression corresponding substantially to the angular position of the ignition means in the ignition type engines.

Cooling of the toroidal cylinder cavity may be accomplished by means of a water jacket integral with, or secured to, the outer cylinder cavity walls. The particular means for circulating and cooling the liquid introduced into the water jacket is not disclosed, since any conventional means therefor may be employed.

The structure generally described is also adaptable to two-cycle operation. A typical engine operating on this principle will be described in detail hereinafter.

The general design and arrangements of the parts described herein permits extremely high horsepower rating for an engine of given size and weight. It also permits great flexibility in engine design, since the maximum output power may be controlled readily by increasing the number of pistons within each continuous toroidal cylinder cavity, or by increasing the number of parallel disposed toroidal cylinder cavities surrounding the central drive shaft. Due to the fact that the rotary reciprocative pistons always have some rotary component, and the whole system of pistons is balanced about a central drive shaft, vibration at a given speed is considerably reduced over that of comparable conventional reciprocating engines.

The compression ratio and piston speeds with respect to the speed of the main drive shaft may be readily controlled to provide any desired operating characteristics, (1) by varying the lengths of the double-ended pistons, (2) by controlling the operational cycle by the design and arrangement of the intake and exhaust ports, and (3) by selecting the gear ratio of the complementary gear systems coupling the crank shaft to the cylinder cavity support. Since no valves are required, it will be seen that synchronizing thereof is unnecessary, as in conventional engines, thereby increasing the flexibility of design of the instant devices.

Among the objects of the invention are to provide a novel valveless internal combustion engine including at least one continuous toroidal cylinder cavity having at least one pair of double-ended arcuate pistons in mutually cooperative rotary reciprocative relation disposed therein. Another object of the invention is to provide a novel valveless four-cycle internal combustion engine including at least one continuous toroidal cylinder cavity having at least two pairs of double-ended arcuate pistons in mutually cooperative rotary reciprocative relation disposed within said cylinder cavity. Another object of the invention is to provide a novel two-cycle internal combustion engine including a continuous toroidal cylinder cavity having at least one pair of double-ended arcuate pistons in mutually cooperative reciprocative relation disposed therein.

Further objects of the invention include a novel method of and means for providing a valveless internal combustion engine including at least one continuous toroidal cylinder cavity having at least one pair of double-ended arcuate pistons in mutually cooperative rotary reciprocative relation disposed therein, a drive shaft normal to the plane of said cylinder cavity, means responsive to rotary reciprocative motion of said pistons for deriving substantially continuous rotary motion therefrom, means for imparting said derived rotary motion to said drive shaft, means for introducing an explosive mixture into the space in said cylinder cavity intermediate any two of said pistons, means for exploding said mixture and means for exhausting said explosive mixture from said space.

An additional object of the invention is to provide an improved method of and means for providing an internal combustion engine including a continuous toroidal cylinder cavity having at least one pair of double-ended arcuate pistons in mutually cooperative rotary reciprocative relation disposed therein, a drive shaft normal to the plane of said cylinder cavity, connecting rods each attached to at least one of said pistons and journaled upon said drive shaft, means responsive to reciprocative motion of said connecting rods and said pistons for deriving substantially continuous rotary motion therefrom, means for imparting said derived rotary motion to said pistons and to said drive shaft, means including at least one intake port in said cylinder cavity for introducing gaseous mixture into the space intermediate successive pairs of said pistons, means including said rotary reciprocative movement of said pistons for compressing said gaseous mixture, means for heating said compressed gaseous mixture, means for expanding said mixture, means including at least one exhaust port in said cylinder cavity for exhausting said gaseous mixture and means for repeating said gas intake, compression, heating, expansion and gas exhaustion cycles for each successive pair of adjacently disposed arcuate pistons within said cylinder cavity.

Another object of the invention is to provide a reversible internal combustion engine including a continuous toroidal cylinder cavity having at least one pair of double-ended arcuate pistons in mutually cooperative reciprocative relation disposed therein.

Further objects of the invention include novel means for providing an internal combustion engine of the type described which includes a novel ring bearing providing a gas seal for an internal slot in said toroidal cylinder cavity means for journaling connecting rods attached to each of the arcuate pistons within said cylinder cavity. Another object is to provide an improved means for providing a valveless internal combustion engine including means defining a continuous toroidal cylinder cavity, having at least one pair of double-ended pistons in mutually cooperative reciprocative relation disposed therein, which include novel means for lubricating the pistons and bearings of said engine, means providing forced gas intake and means providing forced exhaustion of exploded gases within said cylinder cavity. An additional object of the invention is to provide a novel internal combustion engine including a plurality of continuous toroidal cylinder cavities, each having at least one pair of double-ended arcuate pistons in mutually cooperative rotary reciprocative relation disposed therein. An additional object is to provide a novel internal combustion engine including at least one continuous toroidal cylinder cavity, having at least one pair of double-ended arcuate pistons in mutually cooperative rotary reciprocative relation disposed therein, wherein said cylinder cavities include a fluid jacket for cooling said cavities Another object is to provide a novel internal combustion engine including a continuous toroidal cylinder cavity, having at least one pair of double-ended arcuate pistons in mutually cooperative rotary reciprocative relation disposed therein, a plurality of intake and exhaust ports disposed at predetermined angular positions in said cylinder cavity, and means for igniting an explosive mixture introduced through said intake port at predetermined angular relation with respect to said ports.

Another object of the invention is to provide a counter-balanced double-ended arcuate piston having a plurality of piston rings fitted thereto, and arranged to rotate within a continuous toroidal cylinder cavity. Details of this piston form the subject matter of a divisional application, Serial No. 585,139, filed March 27, 1945. A further object of the invention is to provide a novel internal combustion engine including a continuous toroidal cylinder cavity, having at least one pair of double-ended arcuate pistons in mutually cooperative relation disposed therein, and double sealing rings disposed adjacent a continuous slot on the inner peripheral surface of said toroidal cylinder, said sealing rings being arranged to revolve with respect to said cylinder cavity and reciprocate with respect to each other.

Another object of the invention is to provide a novel internal combustion engine including a continuous toroidal cylinder cavity having at least one pair of double-ended arcuate pistons disposed therein, and including means responsive to the expansion of gases between predetermined ones of said pistons for providing forced exhaustion of gas from between predetermined other ones of said pistons.

The invention will be described in further detail by reference to the accompanying drawings of which Figure 1 is a cross-sectional elevational view of one embodiment thereof taken along the section lines I, I of Figure 2 which is a cross-sectional view of the same embodiment taken along the section line II, II of Figure 1;

Figure 4 is a schematic elevational view of a modification of the invention illustrated in Figures 1 and 2;

Figure 5 is a schematic fragmentary elevational view of a second modification of the invention;

Figure 6 is a schematic elevational view of a second embodiment of the invention;

Similar reference characters are applied to similar elements throughout the drawings in order to illustrate better and simplify the accompanying description thereof.

Figure 1:
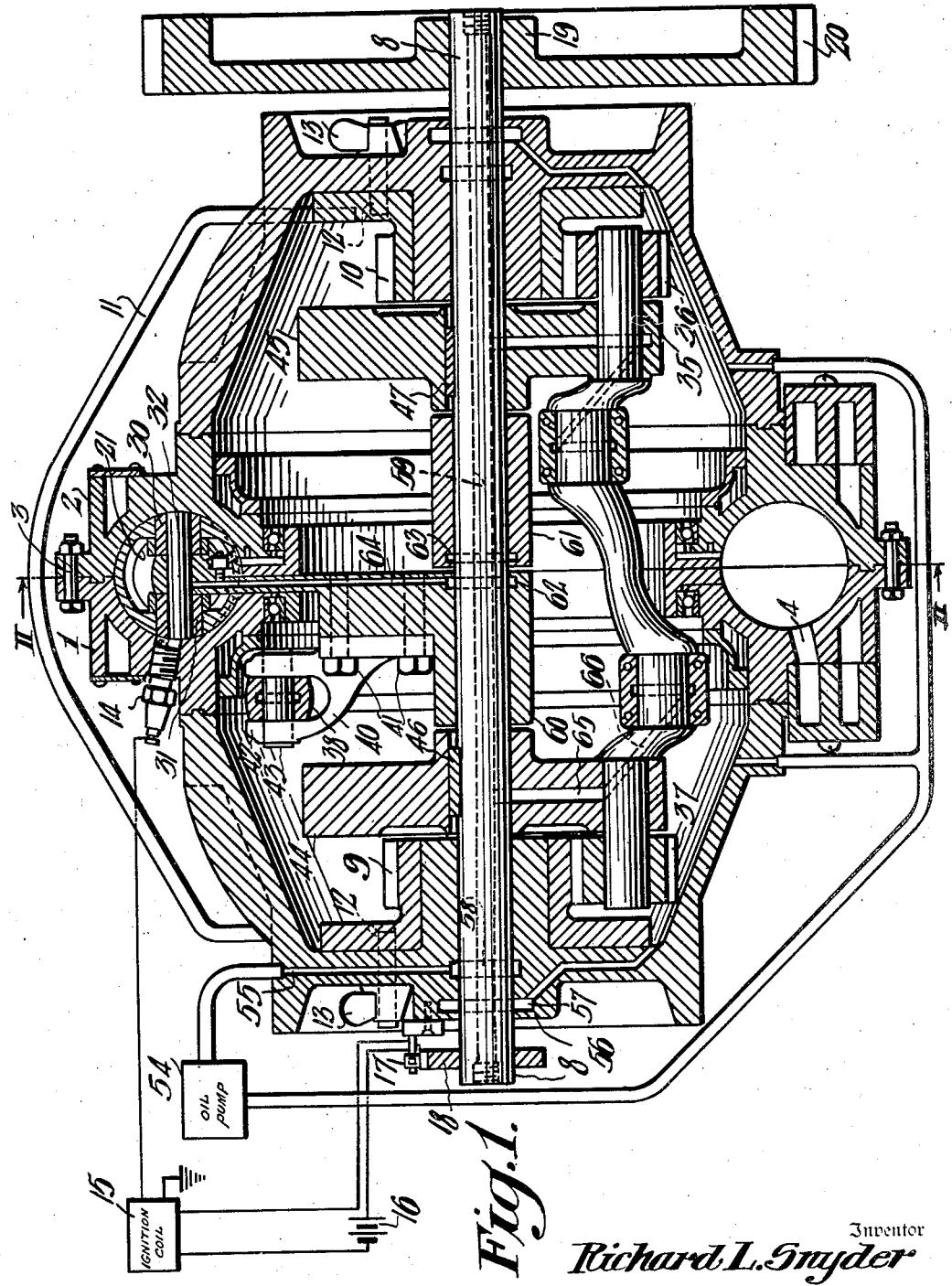
Figure 2:
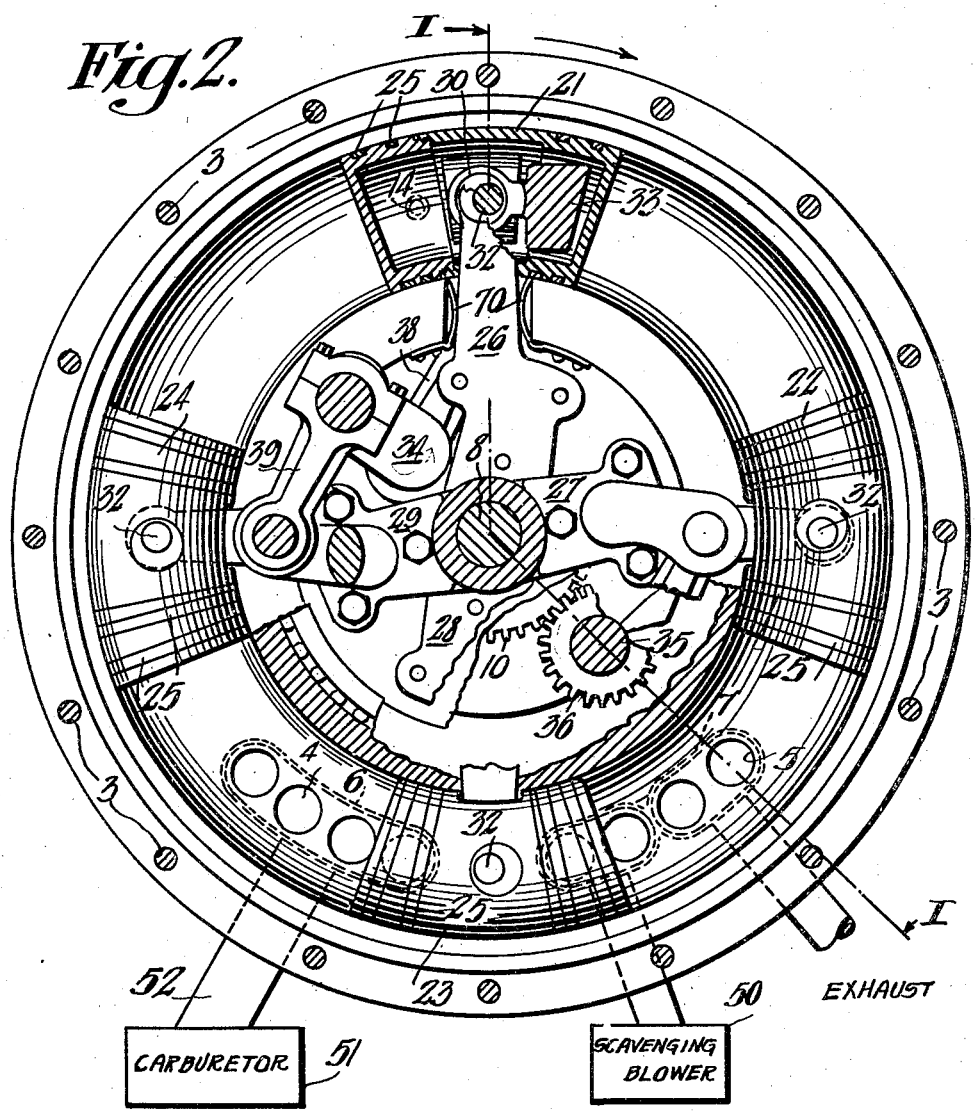

Referring to Figures 1 and 2, the first embodiment of the invention comprises a four-stroke-cycle engine having means defining a single toroidal cylinder cavity having four pistons disposed therein. The means defining the toroidal cylinder cavity comprise a first split casting portion 1 having a keyed portion which engages a complementary keyway in a second split casting portion 2. The two casting portions 1, 2 are clamped together by means of bolts which pass through coincidental apertures 3 equi-spaced around the peripheral edges of the circular complementary casting faces adjacent the keyed portions thereof. The castings 1,2 include cut-out portions for providing a water jacket for cooling the cylinder cavity walls. The castings also include intake and exhaust apertures 4, 5, respectively, which are connected to suitable intake and exhaust manifolds 6, 7, respectively.

The opposite ends of the castings 1, 2 each are journaled to a main drive shaft 8. Fixed gears 9, 10 are adjustably secured to opposite end portions of the castings 1, 2, respectively. Adjustment of the angular position of the gears 9, 10 is provided by a radially extending arm 11, secured to both of the gears. The gears may be clamped in any predetermined angular position by means of clamping bolts 12 having external wing nuts 13. The bolts extend through the gears 9, 10 and through slots in the adjacent end portions of the castings 1, 2.

A spark plug, or glow plug, 14 extends into a spark plug port, proportioned therefor, which opens into the cylinder cavity. Connections for the spark plug 14 are made to a high tension ignition coil 15. A battery, or other source of ignition potential 16, is connected to the primary circuit of the ignition coil 15 through a conventional ignition contactor 17 which is operated by a cam 18. The cam 18 may be mounted on one end of the drive shaft 8, or may be actuated in any other known manner. If a glow plug is used, it may be energized continuously from the battery 16, and ignition timing provided by piston position.

The drive shaft 8 extends centrally through the castings 1, 2 normal to the plane of the cylinder cavity. An external flywheel 19 may, if desired, be secured to the opposite end of the drive shaft from the ignition cam 18. The flywheel 19 may include gear teeth 20 for driving a load, and for cooperation with a starter motor of conventional type.

Four pistons 21, 22, 23, 24 are disposed within the cylinder cavity. These pistons are arcuate in shape and double-ended to provide four cylinders intermediate each two adacent piston faces. The pistons include conventional piston rings 25 and a novel counterbalance arrangement for minimizing radial thrust between the peripheral faces of the pistons and the interior of the cylinder cavity. The pistons 21, 22, 23, 24 are pivoted on corresponding main connecting rods 26, 27, 28, 29, respectively, which as illustrated comprise a pair of double-ended rods each floated upon the main drive shaft 8.

Considering the piston 21, for example, the piston casting includes rotatable bearings 30, 31 in which a piston pin 32 is journaled eccentrically. A counterweight 33, is secured to the rotatable bearings 30, 31. One end of the corresponding main connecting rod 26 is journaled to the center portion of the piston pin 32 intermediate the internal ends of the piston bearings 30, 31. It will be seen that normal radial thrust of the piston due to rotation thereof within the cylinder cavity will be compensated for by means of the resultant radial thrust of the counterbalance 33. Radial thrust of the counterbalance 33 will rotate the piston bearings 30, 31 counterclockwise, thereby increasing the radial thrust of the piston pin 32 in its bearing in the end of the connecting rod 26. The connecting rod 26 may be floated on the main drive shaft 8, thereby preventing radial movement thereof. Since the connecting rod 26 and piston pin 32 cannot move radially, the resultant compensation provides an inward thrust on the piston 21 which tends to make it travel centrally of the toroidal cylinder cavity.

The inner peripheral side of the cylinder cavity includes a continuous slot adapted to receive the four connecting rods 26, 27, 28, 29 to permit the journaling thereof to the main drive shaft 8. A gas seal for the inner peripheral slot comprises a split-ring bearing which extends into the slot and includes apertures having flexible faces 70 for receiving the corresponding connecting rods. The split ring bearings include two separate sets of ball bearings 71, 72 which contact raceways on the sides of a cylinder slot. The two portions 73, 74 of the cylinder bearing are adapted to reciprocate with respect to each other while at the same time providing an effective gas seal between the reciprocating portions and around the sides having the ball bearings in contact with the cylinder cavity bearing raceways. A more detailed description of the split bearing gas seal will be provided hereinafter.

As explained heretofore, the four pistons 21, 22, 23, 24, respectively, are pivoted on corresponding main connecting rods 26, 27, 28, 29, respectively. The first and third connecting rods 26, 28 may comprise a unitary or rigid structure which is journaled on the main drive shaft 8. Similarly, the second and fourth connecting rods 27, 29 may comprise a second unitary or rigid structure also journaled on the main drive shaft 8 adjacent the first and third connecting rods. It should be understood that, if desired, the reciprocating gas seal bearings might be employed for anchoring the corresponding reciprocating connecting rod pairs to eliminate the journaling thereof to the drive shaft 8. A pair of eccentric crank shafts 34, 35 are interposed between the inner peripheral limits of the cylinder cavity and the main drive shaft 8. The axial portions of the first and second crank shafts 34, 35, respectively terminate at their ends in pinion gears 36, 37 which engage respectively the fixed gears 10, 9, respectively. The eccentric portions of the crank shafts 34, 35, respectively, are each journaled to receive two auxiliary connecting rods which, in turn, are journaled to adjacent main connecting rods.

For example, the first eccentric crank shaft 34 is journaled to a first auxiliary connecting rod 38 which, in turn, is journaled to the first main connecting rod 26. Likewise, a second eccentric portion of the first eccentric crank shaft 34 is journaled to a second auxiliary connecting rod 39 which is journaled to the fourth main connecting rod 29. The wrist pin for the first main connecting rod 26, as shown in Figure 1, is held in a bracket 40 secured by bolts 41 to the side of the main connecting rod. The bracket 40 terminates in a forked portion 42 which receives the first auxiliary connecting rod 38 and which is pivoted thereto by means of a wrist pin 43. The second, third and fourth main connecting rods are similarly journaled to corresponding auxiliary connecting rods which, in turn, are journaled to either the first or second eccentric crank shafts 34, 35 as explained heretofore. As a matter of convenience, both the main and auxiliary connecting rod bearings may be of the conventional split bearing type to facilitate assembly and replacement thereof. Similarly, other bearings described herein may be of the split type for the same reason.

The axial portions of the first and second crank shafts 34, 35 are also journaled in cylindrical cranks 44, 45 which are disposed intermediate the main connecting rod bearings and the fixed gears 9, 10. The two cylindrical cranks 44, 45 are both keyed by means of keys 46, 47, respectively, to the main drive shaft 8.

It will be seen that relative reciprocative motion of the four pistons 21, 22, 23, 24 will provide similar reciprocative motion of the corresponding main connecting rods 26, 28 with respect to the remaining pair of connecting rods 27, 29. Considering only the main connecting rods 26, 29; relative reciprocative motion thereof will provide rotary motion of the first crank shaft 34 due to the coupling provided between the main connecting rod and the eccentric crank shaft by means of the auxiliary connecting rods 38, 39, respectively. Since the rotary motion delivered to the eccentric crank shaft 34 will be transmitted to the corresponding pinion gears secured to the axial ends thereof, the pinion gear will rotate about the fixed gears 9, 10. The rotation of the pinion gears about the fixed gears will thereby provide rotary motion of the cylindrical cranks 44, 45 keyed to the main drive shaft 8, and of the corresponding eccentric crank shaft about the main drive shaft 8, with resultant rotary motion of the main connecting rods 26, 29 coupled thereto. Since the first and fourth main connecting rods 26, 29, and the third and second connecting rods 28, 27 rigidly coupled respectively thereto, are caused to rotate about the axis of the main drive shaft 8, the corresponding pistons 21, 22, 23, 24 will also rotate about the axis of the center shaft 8. It therefore will be seen that the pistons have relative reciprocative motion with respect to each other and, in addition, have rotary motion along the toroidal cylinder cavity due to the travel of the pinion gears around the complementary fixed gears secured to the cavity structure.

Similarly, the ring bearings providing the gas seal within the slotted inner periphery of the cylinder cavity will rotate as the corresponding connecting rods passing therethrough rotate about the main drive shaft 8. Also, the two portions of the split bearing-gas seal will reciprocate with respect to each other in the same manner and at the same time as the adjacent connecting rods and pistons reciprocate with respect to each other.

The locations of the intake and exhaust ports 4, 5, respectively, with respect to the location of the ignition plug 14, are clearly illustrated in Figure 2. If we consider a typical four-stroke-cycle insofar as the "cylinder" intermediate the third and fourth pistons 23, 24 is concerned, clockwise rotation of the pistons, as indicated by the arrow, will provide gas intake to the cylinder from the intake manifold 6 through the intake ports 4, since in this position the third and fourth pistons 23, 24, respectively, are moving away from each other. As the clockwise rotation of the pistons progresses, the pistons commence to move toward each other, due to the reciprocative motion thereof, and at a point substantially coincidental with the ignition plug 14 the compression of the explosive mixture between the pistons reaches a maximum value. The ignition provided by the ignition device 14 explodes the compressed gases, delivering power to the pistons which tends to drive them farther apart, thereby delivering energy to the corresponding main connecting rods 28, 29. When the pistons 23, 24 reach a position approximately coincidental with the illustrated position of the piston 22, as shown in Figure 2, they commence to move toward each other again, thereby providing pressure for exhaustion of the exploded gases through the exhaust ports 5 and the exhaust manifold 7. After the "cylinder" has passed, the exhaust ports 5, the pistons 23, 24 again begin to move apart and pass the intake ports 4 for a repetition of the four-stroke-cycle thus described.

If desired, a scavenging blower 50 may be connected to one or more of the exhaust ports to facilitate scavenging of the "cylinder" during the exhaust stroke. Any conventional type of carburetor 51 and intake manifold connection 52 may be provided which will furnish a suitable explosive mixture to the intake ports 4. Similarly, forced intake of the explosive gaseous mixture may be provided by applying pressure to force the mixture from the carburetor through the intake ports 4 when they are uncovered by the several pistons.

It will be seen that the "cylinder" intermediate each pair of double-ended pistons will follow the same four-stroke-cycle as that described heretofore, and that a single set of intake ports, exhaust ports and a single ignition plug will provide similar operation for each of the successive "cylinders" passing these points. Therefore, it will be seen that each complete revolution of a particular piston about the main drive shaft 8 will occur during four complete four-stroke-cycles of the "cylinders" intermediate the various pistons. Since the gear ratio between the pinion gears 36, 37 and the fixed gears 10, 9, respectively, are selected to be of one to two ratio, the main drive shaft will be turned by the cylindrical cranks 44, 45, through one complete revolution as each of the pistons turn through one complete revolution, thereby providing four explosions of the gaseous mixture for each complete revolution of the main drive shaft.

The external flywheel 19 may, if desired, be omitted, since considerable inertia is provided by the relatively heavy cylindrical cranks 44, 45 which are keyed to the main drive shaft 8.

Oiling of the various bearings and moving surfaces described heretofore is provided by a central oil pump 54 of conventional design. The oil under pressure from the pump 54 is introduced, for example, into the end of the main casting 1 and passes therethrough through an oil duct 55. The bearing 56 in the end of the main casting 1 includes a slotted portion 57 which coincides with a hole 58 extending into the main drive shaft 8. The hole 58 terminates in a longitudinal hole 59 which extends substantially the full length of the main drive shaft 8. Radial holes, connecting the interior hole 59 of the main drive shaft to the periphery thereof, are provided at each of the bearings 60, 61 of the main connecting rods. The main connecting rod bearings 60, 61 each include slotted portions 62, 63, respectively, which connect to radial oil ducts 64, within the corresponding main connecting rods. The radial oil duct 64 in the main connecting rod 26 extends the full length thereof to supply oil to the piston pin 32 of the piston 21. The wrist pins 43, between the auxiliary connecting rods and the forked bracket bearings 42, are lubricated through the duct 65 in the cylindrical crank 44 and the longitudinal duct 66 in the crank shaft 35, and thence through longitudinal ducts in the auxiliary rods. Similarly, a portion of the oil circulating through the radial duct 64 is diverted within the piston 21 to lubricate the surface faces thereof adjacent the piston rings 25. Lubrication for the eccentric crank shaft bearings is provided by a radial duct 65 extending through the cylindrical crank 44 to the axial portion of the eccentric crank shaft 35 journaled thereto, as explained heretofore with respect to the wrist pins. Lubrication for the bearing in the end of the auxiliary connecting rods journaled on the eccentric portion of the crank shaft is provided by a longitudinal oil duct 66 through the center of the eccentric crank shaft.

Figure 3:
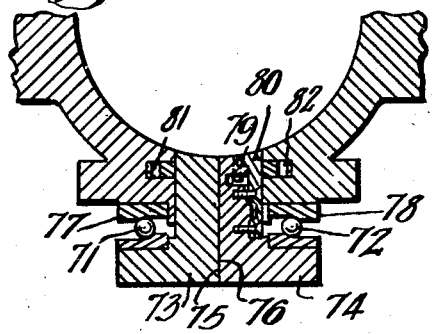
Figure 3 is an enlarged fragmentary cross-sectional view of a portion of the cylinder cavity showing the ring bearing-gas seal.

Figure 3 shows, in cross-section, the double sealing rings 73, 74, which provide a gas seal for the slot on the inner peripheral surface of the toroidal cylinder cavity. Each of the rings are apertured to receive different ones of the several main connecting rods, as shown in Fig. 1. The sealing rings include polished complementary surfaces 75, 76, which provide a satisfactory gas seal for the cylinder cavity while permitting relative reciprocative motion of the two rings. The sealing rings are arranged to revolve with respect to the cylinder cavity as the main connecting rods which pass therethrough revolve about the main drive shaft 8. The sealing rings are accurately centered adjacent the cylinder cavity slot by means of the ball or roller bearings 71, 72 disposed in bearing guide channels 77, 78. One sealing ring 74 is split and is provided with an expanding spring member 79 disposed intermediate the sealing ring and the split ring portion 80. The expanding spring member is mortised to the main portion of the sealing ring 74 in any convenient manner to prevent substantial gas leakage. The continuous pressure provided by the spring member 79 provides uniform contact between the complementary surfaces of the reciprocating sealing rings, and also constitutes a simple and effective means for compensating for incidental wear of either of the reciprocating rings, or the cylinder cavity guides therefor. Additional springs 81, 82 are interposed in slots in the cavity wall to exert pressure on the bearing portions 78, 80, respectively. The split sealing ring is preferably constructed so that internal pressure aids the spring member 77 to improve the gas seal.

It should be understood that these reciprocating sealing rings may be employed to provide the actual power transmission means between the rotary reciprocating pistons and the eccentric crank shafts. An arrangement of this type wherein the main connecting rods may be omitted entirely is illustrated and described hereinafter in Figure 4. It will be seen that the ball bearing arrangement for floating the sealing rings upon the inner peripheral wall of the cylinder cavity provides a bearing surface which effectively prevents radial thrust of short connecting rod members which may be provided to connect the individual pistons to corresponding ones of the sealing rings. This arrangement saves the space ordinarily required for the main connecting rods which, as shown in Figs. 1 and 2, are journaled to the main drive shaft, and thereby permits relatively heavier main drive shafts and eccentric crank shafts to be employed in engines of predetermined cross-sectional dimensions.

Figure 4 is a modification of the invention wherein eight double-ended arcuate pistons 21, 21', 22, 22', 23, 23', 24, 24' are disposed within a single toroidal cylinder cavity. Four of the pistons 21, 22, 23, 24, are secured to one of the rotatable sealing rings 73 by means of short connecting rods 83, 84, 85, 86, respectively. The remaining intermediately disposed four pistons 21' 22', 23', 24' are similarly secured to the second sealing ring 74 by means of their respective short connecting rods 87, 88, 89, 90. The individual pistons preferably should be of the same general type as that described in Figures 1 and 2. The individual short connecting rods are journaled to the individual piston pins in the same manner as described with respect to the main connecting rods of Figure 1. The piston counterbalance feature described in detail heretofore may be included, if desired, although the necessity, therefore, is substantially reduced due to the relatively shorter, lighter pistons which may be employed in the eight piston modification.

The first sealing ring 73 includes an extended portion 91 having a bearing adapted to receive a first wrist pin 92. One end of a first auxiliary connecting rod 38 is journaled to the first wrist pin 92. The remaining end of the first auxiliary connecting rod 38 is journaled to one eccentric portion of a first eccentric crank shaft 34. At a point removed 180° from the first projection 91 of the first sealing ring 73, a second sealing ring projection 93 is similarly pivoted to one end of a second auxiliary connecting rod 38'. The remaining end of the second auxiliary connecting rod 38' is journaled to an eccentric portion of a second eccentric crank shaft 35.

Similarly, a first projection 94 of the second sealing ring 74 is pivoted to one end of a third auxiliary connecting rod 39. The remaining end of the third auxiliary connecting rod 39 is journaled to a second eccentric portion of the first eccentric crank shaft 34. In a similar manner, a second projection 95 of the second sealing ring 74 is pivoted to one end of a fourth auxiliary connecting rod 39'. The remaining end of the fourth auxiliary connecting rod 39' is journaled to a second eccentric portion of the second eccentric crank shaft 35.

The axial portions of the first and second eccentric crank shafts 34, 35 are journaled in suitable bearings adjacent the periphery of cylindrical crank members 44, 45, which are keyed to the main drive shaft 8 in the same manner as described in detail in Figures 1 and 2. Similarly, the axial end portions of the eccentric crank shafts 34, 35 are keyed to small pinion gears 36, 36', 37, 37', respectively. The small pinion gears 36, 36', 37, 37' engage internal gear rings 9, 10 which are secured to the inner peripheral surface of the cylinder cavity means 1. The internal gear rings 9, 10 may be adjustable through a predetermined angle with respect to the cylinder cavity for timing the movement of the several pistons with respect to the intake and exhaust ports and the ignition devices.

With the exception of the omission of the main connecting rods, and the substitution therefor of the short connecting rods interposed between the sealing rings and the respective piston pins; and the large internal gear rings which are substituted for the fixed gears of the device of Figures 1 and 2, the power transmission elements of the instant modification of the invention may be similar to the four piston machine previously described.

Either the four piston, or the eight piston, modification may be arranged to provide for reversal of the direction of rotation of the pistons within the cylinder cavity, and hence the direction of rotation of the main drive shaft. If it is desired to provide for operation of the engine in both clockwise or counterclockwise directions, it is necessary merely to provide for interchanging of the intake and exhaust ports on each side of the cylinder cavity. This feature may be accomplished by interconnecting the ports 4 on the lefthand side of the engine with the ports 4' on the righthand side of the engine by means of manifolds 6, 6', respectively, which are joined to a common manifold 6''. Similarly, the ports 5 on the left side of the engine and ports 5' on the right side of the engine are connected together through manifolds 7, 7', respectively, which are joined to a second common manifold 7''. The two common manifolds 6'', 7'' are connected to opposite arms of a forked crossover manifold 96 which includes a butterfly valve 97. One remaining arm of the forked manifold is connected to the carburetor 51, while the remaining fourth arm is connected to the exhaust manifold. It will be seen that, if the butterfly valve 97 is in the position indicated in the drawings, the ports 4 on the left side of the engine and the ports 4' on the right side of the engine will be intake ports, while the remaining ports on each side of the engine will be exhaust ports. However, if the butterfly valve is rotated 90°, the functions of the respective ports will be interchanged.

In operation, the power transmisison from the various pistons to the main drive shaft is quite similar to that described in Figures 1 and 2, with the exception that the sealing rings transmit the power from the short connecting rods to the auxiliary connecting rods. Since two sets of intake and exhaust ports are provided at intervals of 180° around the cylinder cavity and since two ignition devices 14, 14' are also provided at points substantially intermediate the two groups of ports, each "cylinder" comprising the space intermediate two adjacent double-ended pistons passes through a complete four-stroke cycle during each half revolution around the cylinder cavity. Since the eight pistons provide eight "cylinders" intermediate thereof, it follows that there will be sixteen power strokes during each complete revolution of each of the pistons. The great number of power strokes provided by means of the eight piston modification described will permit considerable power to be transmitted to the main drive shaft 8, while minimizing vibration and providing extremely low-speed, high-power operation.

It should be understood that the number of power strokes provided in multi-piston engines of the type described will be proportional to the square of the number of pistons employed in each cylinder cavity, providing a suitable arrangement of intake and exhaust ports and ignition devices is included to provide successive four-stroke cycle operation for each piston. In four-stroke-cycle operation, the number of power strokes per torus is equal to the square of the number of pistons divided by 4. In two-stroke-cycle operation the number is $$\frac{P^2}{2}$$

where P is the number of pistons.

Figure 5 illustrates a modification of the device described in detail in Figure 4 wherein the speed of rotation of the main drive shaft may be increased over that provided by direct coupling through the cylindrical cranks 44, 45 between the eccentric crank shafts and the main drive shaft. It should be understood that the internal ring gears 9, 10 of Figure 4 may be incorporated in any of the other embodiments of the invention disclosed herein. In Figure 5 the fixed gear 9 is meshed with the two small pinion gears 36, 36' which are connected respectively to the axial ends of the two eccentric crank shafts 34, 35. As explained heretofore, the axial portions of the two eccentric crank shafts 34, 35 are journaled in the cylindrical cranks 44 which in turn are keyed to the main drive shaft 8. A hollow auxiliary drive shaft 8' surrounds the main drive shaft 8 and extends through the main bearings in the ends of the motor frame to whatever load device is coupled to the engine. Bearings of any known type may be provided between the main and auxiliary drive shafts. The auxiliary drive shaft is keyed to an external gear 98 which is meshed with both pinion gears 36, 36'. The relative number of teeth in the pinions 36, 36' and the internal and external gears will determine the speed of rotation of both the main drive shaft 8 and the auxiliary hollow drive shaft 8' with respect to the speed of rotation of the pistons within the cylinder cavity.

It should be understood that an internal gear could be substituted for the external gear keyed to the auxiliary drive shaft in any of the embodiments of the invention disclosed herein without departing from the spirit and scope thereof.

Figure 6 is a typical embodiment of the teachings of the instant invention applied to two piston and particularly two-stroke-cycle, engines. In general, the characteristics of the two piston or two-stroke-cycle engines are similar to those described heretofore for the various modifications of the four-stroke-cycle engine. The essential differences reside in the length of the two double-ended pistons, and the method of coupling the reciprocating double-ended pistons to the eccentric crank shafts. In the two and four piston arrangements where the desired ratio of rotational velocity of the crank shafts to that of the main shaft is 2, or less, the internal gear is not practical.

It should be understood that the pinions engaging the gear on the auxiliary drive shaft need not necessarily be those that engage the fixed gear, thus any speed ratio may be obtained.

In the four piston case, for example, the crank shaft-to main shaft speed ratio may be 4 to 1, rather than 2 to 1 as shown, in which case two firing, intake and exhaust positions may be used for each revolution, thus increasing the power.

In the embodiment illustrated in Figure 6 each piston extends through an angle of the order of 120 degrees in the cylinder cavity, and may include suitable piston rings, not shown. If desired, the same type of piston counterbalance may be included as is described heretofore in the engine illustrated in Figures 1 and 2. A first piston 101 includes a piston pin 102 journaled to a first main connecting rod 103 which is floated upon the main drive shaft 8, in much the same manner as described heretofore. The main connecting rod is extended diametrically toward the inner peripheral portion of the cylinder cavity and includes two branched portions 104, 105, forming a modified T.

Each branched portion 104, 105 of the first main connecting rod 103 includes a bearing to receive wrist pins 106, 107 respectively journaled to auxiliary connecting rods 108, 109, respectively. The auxiliary connecting rods 108, 109, are journaled to suitable eccentric portions of two eccentric crank shafts 34, 35, in the same manner as described heretofore in the other modifications of the invention.

A second main connecting rod 110 is journaled to a second piston pin 111 in a second double-ended piston 112 and also floated upon the main drive shaft 8. The second main connecting rod 110 also includes branched portions 113, 114 forming a modified T which include bearings to receive wrist pins 115, 116 respectively journaled to third and fourth auxiliary connecting rods 117, 118, respectively. The third auxiliary connecting rod 117 is journaled to a second eccentric portion of the first eccentric crank shaft 34, while the fourth auxiliary connecting rod 118 is journaled to a second eccentric portion of the second eccentric crank shaft 35. The axial portions of the two crank shafts are journaled in cylindrical cranks 44, 45 which are keyed to the main drive shaft 8 in the same manner as described heretofore in the other modifications of the invention. It will be seen that the T-shaped main connecting rods provide a completely balanced drive assembly which minimizes vibration and irregularities in motor speed.

The axial portions of the eccentric crank shafts include pinion gears 36, 36', respectively, which are meshed with a fixed gear 10, which is secured to the motor housing in the same manner as described in the modification disclosed in Figure 1.

In a two-stroke-cycle engine of the type shown in Figure 6 an ignition device 14 may be located at the point indicated, while intake and exhaust ports 4, 5, respectively, would be disposed relatively close together, and substantially diametrically therefrom. A conventional carburetor 51, and blower 119 to provide forced gas intake is connected through a conventional intake manifold 52 to the intake port 4. In the two stroke cycle, two piston engine shown, there is a one-to-one relationship between the crankshaft gears and the fixed gear. A two-to-one relationship could be used if the exhaust, intake, and firing positions were doubled.

It should be understood that the two stroke cycle mode of operation can be used in any of the embodiments of the invention shown and described herein.

It should be understood that the two piston embodiment of the invention could also be adapted to four-stroke-cycle operation by suitably positioning the intake and exhaust ports as described heretofore, and by suitably interrupting the ignition circuit to provide expansion of compressed gases on a four-stroke-cycle basis. It further should be understood that the operating faces of the double-ended pistons may be especially shaped to facilitate the exhausting of the expanded gases and the intake of additional fuel in any manner well known in the art. Furthermore, the exhausting of the expanded gases may be facilitated by employing blowers or other forced gas exhausting means, not shown.

Figure 7:
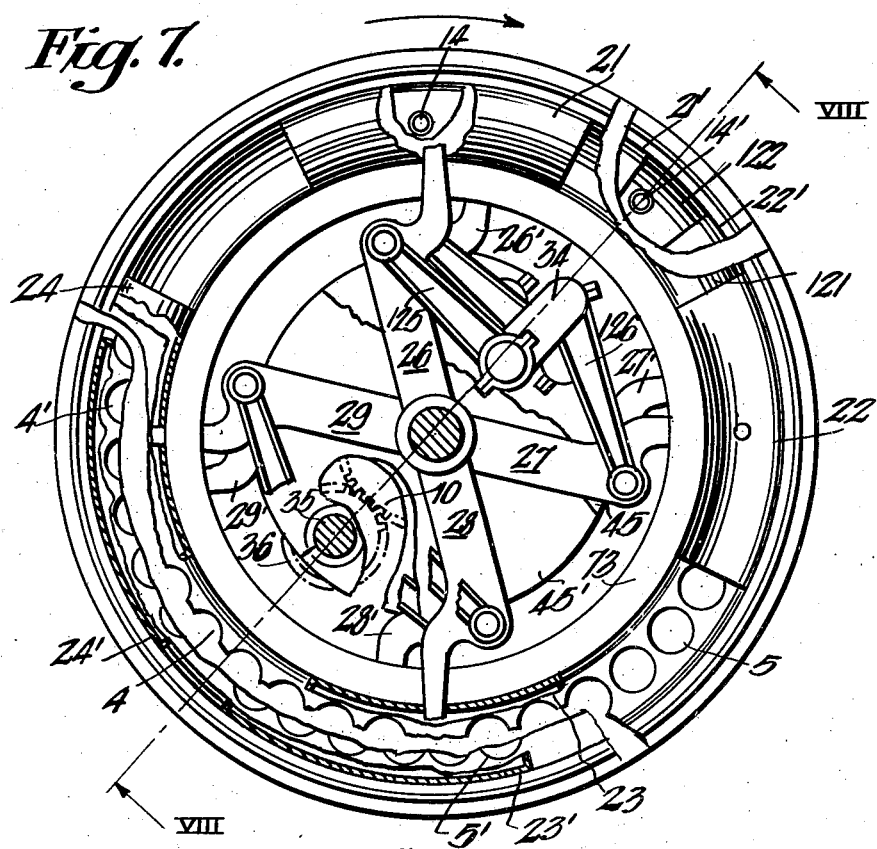
Figure 7 is a cross-sectional elevational view of a third embodiment taken along the section lines VII, VII of Figure 8 which is a cross-sectional view of said third embodiment taken along the section lines VIII, VIII of Figure 7.
Figure 8:
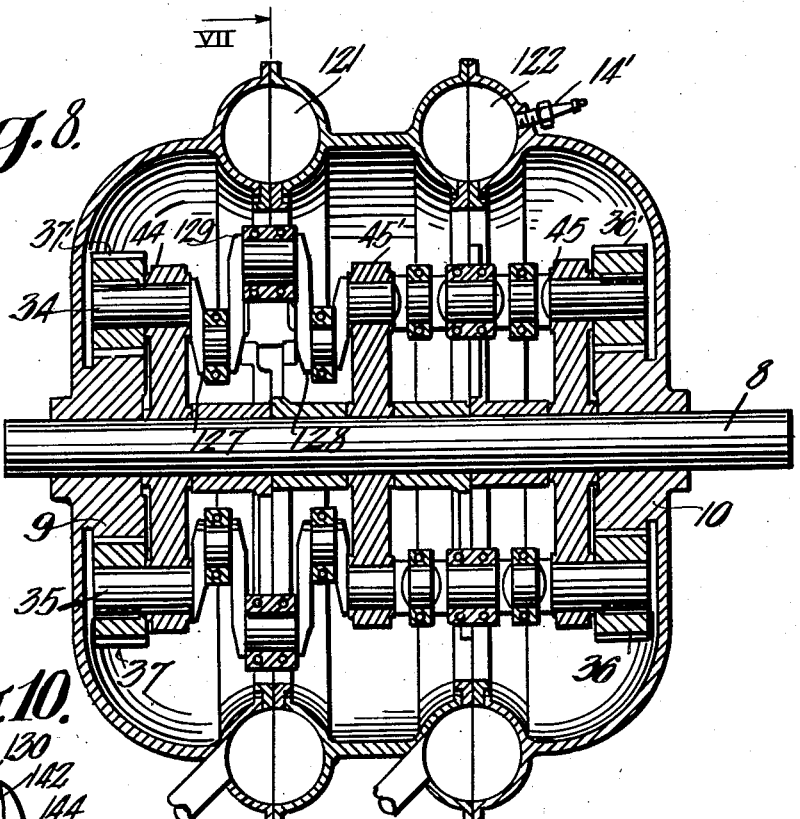

Figures 7 and 8 comprise an embodiment of the invention employing two cylinder cavities 121, 122, in parallel relation, coaxial with a common main drive shaft 8. Four arcuate double-ended pistons 21, 22, 23, 24, are disposed within one of the cylinder cavities 121, and four similar pistons 21', 22', 23', 24' are disposed within the second cylinder cavity 122, in the same manner as described heretofore in the embodiment of the invention illustrated in Figures 1 and 2. The several pistons are pivoted upon main connecting rods which are floated upon the central drive shaft. The several main connecting rods are journaled to auxiliary connecting rods which, in turn, are journaled to eccentric crank shafts. The axial portions of the eccentric crank shafts are journaled in cylindrical cranks which are keyed to the main drive shaft. The axial end portions of the eccentric crank shafts include pinion gears which revolve about fixed gears secured to the motor frame and the cylinder cavities.

The essential difference between the instant embodiment of the invention and the four-stroke-cycle, four-piston embodiment disclosed in Figures 1 and 2 is that in the instant "two cylinder" device the timing of the pistons in the two cylinder cavities is staggered to provide expansion strokes at angular intervals of 45° about the main drive shaft. To conform therewith, the ignition device 14 and the intake and exhaust ports, 4, 5, respectively, of one cylinder cavity 121 are displaced 45° from the corresponding positions of the ignition device 14' and the intake and exhaust ports 4', 5' of the second cylinder cavity 122.

Similarly, the eccentric portions of the eccentric crank shafts coupled to one cylinder cavity are displaced 90° with respect to the corresponding eccentric portion of the crank shaft coupled to the other cylinder cavity.

In the particular modification of this embodiment of the invention illustrated in the drawings, the eccentric crank shafts and auxiliary connecting rods are of the completely balanced type shown in Figure 9 and described in greater detail hereinafter. Furthermore, in order to provide greater rigidity and reduced vibration and wear on the bearing surfaces of the eccentric crank shafts, a centrally disposed cylindrical crank 45' supplements the first and second cylindrical cranks 44, 45 disposed adjacent the pinion gears 36, 36', 37, 37' at the axial ends of the crank shafts 34, 35.

In the particular structure shown in the drawings, an external fixed gear 9, 10 is meshed at each end of the crank shafts 34, 35 with the corresponding pinion gears fixed to the ends of the crank shafts. However, an internal ring type gear of the type disclosed in the modification described in Figure 4, might be employed to equal advantage. Furthermore, the differential type gear drive disclosed in Figure 5 might be substituted in the present embodiment to provide greater output shaft speed.

Similarly, the main connecting rods 26, 27, 28, 29 and 26', 27', 28', 29', floated upon the main drive shaft, might be omitted, and short connecting rod stubs might be interposed between the pistons and suitable projections on the ring bearing gas seal as disclosed and described in the embodiment of Figure 4.

It should be understood that as many cylinder cavities as desired may be disposed in parallel relation and coupled through suitable crank shafts and cylindrical cranks to the main drive shaft. Furthermore, the timing of the pistons in the several cylinder cavities may be staggered in any desired manner to minimize engine vibration and provide uniform output drive power.

Figure 9:
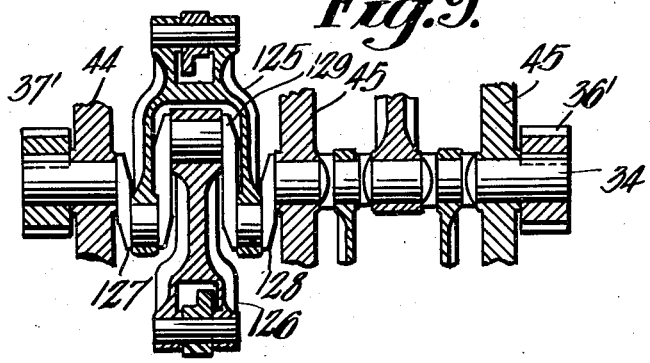
Figure 9 is an enlarged fragmentary view of the balanced crankshaft assembly of said third embodiment.

The unbalanced type of connecting rod disclosed in the previously described embodiments of the invention may be substituted for the balanced type of connecting rod shown in Figure 9.

The counterbalanced pistons described in detail heretofore in Figures 1 and 2 may be included in the present embodiment of the invention. Also, the numerous features described heretofore with respect to engine lubrication, engine adjustment, cooling, fuel intake and fuel exhaust may be incorporated in the present embodiment of the invention in the same manner as described heretofore for the single cylinder cavity embodiments.

It will be seen that by limiting the size of the individual cylinder cavities and the pistons therein to relatively small dimensions, that piston speeds may be maintained at practical operating values, while large output power may be obtained by employing as many cylinder cavities in parallel arrangement as may be required. The general arrangement of the multi-cylinder cavity engine disclosed provides considerable rigidity of all power transmitting elements, since cylindrical cranks are interposed between the main drive shaft and the eccentric crank shafts intermediate each cylinder cavity, and pinion gears with complementary fixed gears may likewise be disposed at several axial points along each crank shaft, although this feature is not illustrated herein.

Even in a multi-cylinder engine, the ignition problem is extremely simple, since only one ignition device is required in each cylinder cavity for each four pistons employed therein. It should be understood that eight or more pistons may be employed in each of the cylinder cavities of a multi-cylinder engine, and that the eight piston modification described in Figure 4 would be readily adaptable to the multi-cylinder embodiment of Figures 7 and 8. If a two-stroke-cycle is used, twice as many ignition points must be provided in each cylinder cavity and the intake and exhaust ports must be rearranged as explained heretofore.

Figure 9 is a fragmentary view of one of the eccentric crank shafts disclosed in Figure 8. The balanced connecting rods 125 and 126 are coupled to the eccentric portions 127, 128 and 129, respectively, of the crank shaft 34. Applicant does not claim the specific structure of the balanced connecting rods as part of his invention, but has illustrated them herein merely to show that this balanced feature may be incorporated readily in any of the modifications of the invention disclosed herein. Furthermore, it should be understood that more than two crankshafts, of either general type illustrated, may be employed where the power to be transmitted thereby makes further load distribution desirable.

Figure 10:
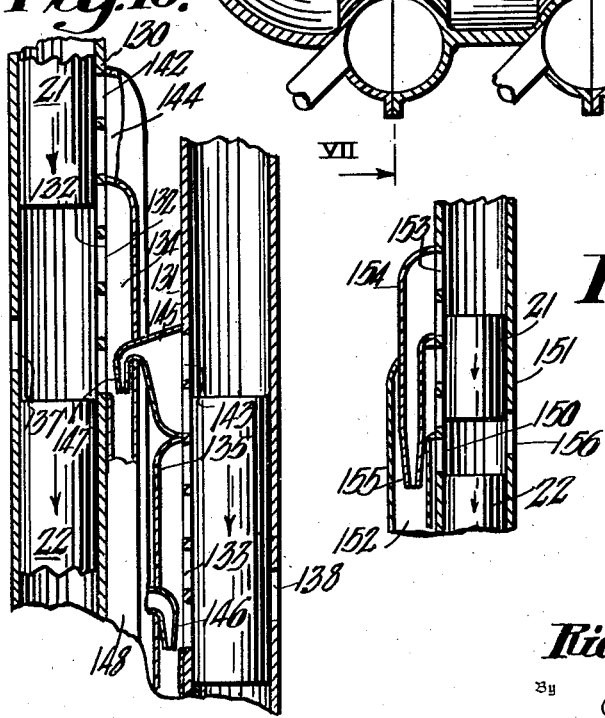
Figure 10 is a cross-sectional view of a means for scavenging the cylinders of the foregoing embodiments of the invention.

Figure 10 is a modification of the invention for providing forced exhausting (or induction scavenging), of exploded gases from between adjacent double-ended pistons as they pass a series of exhaust ports in the wall of the cylinder cavity. For the purpose of simplifying the explanation, the cylinder cavity and pistons are illustrated as straight cylindrical elements. However, it should be understood that the same improvements should be applied to toroidal cylinders having arcuate double-ended pistons disposed therein.

Figure 10 illustrates the application of this feature to the embodiment of the invention which employs at least two cylinder cavities of the type described heretofore in Figures 7 and 8. The walls of each of the cylinders 130, 131 respectively, include a plurality of main exhaust ports 132, 133 respectively, which open into main exhaust manifolds 134, 135 respectively, and a plurality of auxiliary exhaust ports 142, 143 which open into auxiliary exhaust manifolds 144, 145, respectively. A portion of the exhausted gases is expelled through the auxiliary exhaust ports by the reciprocating action of the pistons 21, 22, and passes through a nozzle portion 146, 147 for each of the corresponding auxiliary exhaust manifolds 144, 145, respectively. As the piston 21 progresses in the direction indicated by the arrow, additional gases remaining in the "cylinder" are expelled through the main ports 132 and pass through the main manifold 134 which terminates in an outlet manifold 148.

Similarly, some of the gases in the second "cylinder" defined by the cylinder walls 131 pass through the auxiliary ports 143 into the second auxiliary manifold 145 which terminates in the restricted nozzle portion 147, which extends into the first main manifold 134 of the first cylinder cavity. The exhausting of gases through the restricted manifold portion 147 creates a partial vacuum at the ports 132 in the first cylinder, tending to exhaust all remaining gases in the first cylinder.

Similarly, as gases are exhausted by the reciprocating action of the pistons in the second cylinder and expelled through the ports 133 into the second main exhaust manifold 135 associated therewith, they are expelled into the main exhaust outlet manifold 148. Residual gases remaining in the second "cylinder" are further exhausted by the partial vacuum created adjacent the ports 133 of the main manifold 135 by means of the gases ejected from the restricted nozzle portion 146 of the second auxiliary manifold 144. Separate ports 137, 138 in each of the cylinders may be open to the air opposite the low pressure main exhaust ports to provide fresh air to replace the burned gases exhausted through the exhaust ports.

It will be seen that a portion of the gases exhausted from each of the cylinders provides, by means of the auxiliary constricted jets 146, 147 respectively, partial vacuums adjacent the main exhaust ports in the main exhaust manifolds of the complementary cylinders to exhaust substantially all remaining exploded gases in the corresponding "cylinders."

Since the efficiency of internal combustion engines may be increased from 10 to 20 percent by providing efficient exhausting of the cylinders thereof, the system described will provide considerably increased power output for engines of predetermined dimensions and operating characteristics without necessitating additional valves or moving parts common to known scavenging systems.

Figure 11:
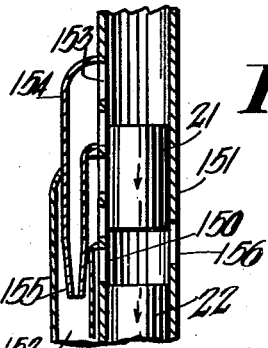
Figure 11 is a cross-sectional view of an optional means for scavenging said cylinders.

Figure 11 is a modification of the induction scavenging system of Figure 10 which is adapted to operation in a single cylinder cavity engine. The ports 150 in the walls 151 of the cylinder cavity open into a conventional main exhaust manifold 152. A second group of ports 153 which precede the first group of ports 150 in the path of the rotating pistons 21, 22, respectively, open into an auxiliary exhaust manifold 154 which terminates in a restricted jet portion 155. Gases forced, by the reciprocating action of the pistons 21, 22, through the auxiliary manifold 154 and the restricted jet portion 155, provide a partial vacuum adjacent the first group of ports 150 for exhausting residual gases from the "cylinder" intermediate the pistons 21, 22 after the "cylinder" has been exhausted normally by the reciprocating action of the pistons adjacent the first group of ports 150. An auxiliary "breather" port 156 is provided to admit fresh air to the "cylinder" adjacent the main exhaust ports 150.

The operation of the system described in Figure 11 is quite similar to that of the system described in Figure 10 with the exception that the rotary reciprocative movement of the relatively shorter pistons in a single cylinder cavity provides both normal and forced exhausting of gases intermediate said pistons in said cylinder cavity.

Thus the invention disclosed herein comprises several embodiments and modifications of a toroidal type internal combustion engine including one or more toroidal cylinder cavities each having a plurality of arcuate double-ended pistons disposed therein in mutual rotary reciprocative relation. It should be understood that the various embodiments and modifications described may be combined in the manners indicated herein, and that the various novel features of each of said embodiments and modifications may be combined in the remaining embodiments of the invention in any manner apparent to one skilled in the art.

I claim as my invention:

1. A two cycle internal combustion engine including means providing a continuous toroidal cylinder cavity, at least one pair of arcuate double-ended pistons in mutually cooperative rotary reciprocative relation disposed within said cylinder cavity, a main drive shaft normal to the plane of said cylinder cavity, connecting rods each attached to at least one of said pistons and floating upon said drive shaft, means including a multiple throw crank shaft extending entirely through said toroidal means responsive to rotary reciprocative motion of said connecting rods for deriving substantially continuous rotary motion therefrom, means including cylindrical cranks symmetrically disposed on said main shaft with respect to said toroidal means and journalled to said crank shaft for imparting said derived continuous rotary motion to said drive shaft, means for introducing an explosive gaseous mixture into the space in said cylinder cavity intermediate two of said pistons, means for exploding said mixture upon predetermined rotation of said two pistons, and means for exhausting said exploded mixture upon further predetermined rotation of said two pistons.

2. A two-cycle internal combustion engine including means defining a continuous toroidal cylinder cavity, at least one pair of arcuate double-ended pistons in mutually cooperative rotary reciprocative relation disposed within said cylinder cavity, a main drive shaft normal to the plane of said cylinder cavity, main connecting rods each attached to at least one of said pistons and floating upon said drive shaft, at least one multiple throw crank shaft extending entirely through said toroidal means, auxiliary connecting rods interconnecting at least two of said main connecting rods and said crank shaft, a plurality of crank means anchored on said main drive shaft symmetrically with respect to said toroidal means, means coupling said crank shaft to each of said crank means for providing rotation of said main drive shaft, means for introducing an explosive gaseous mixture into the space in said cylinder cavity intermediate two of said pistons, means for exploding said mixture upon predetermined rotation of said two pistons, and means for exhausting said exploded mixture upon further predetermined rotation of said two pistons.

3. An internal combustion engine including means defining a continuous toroidal cylinder cavity, at least one pair of double-ended arcuate pistons in mutually cooperative rotary reciprocative relation disposed within said cylinder cavity, a main drive shaft normal to the plane of said cylinder cavity, main connecting rods each substantially rigidly attached to at least one of said pistons and journaled upon said drive shaft, at least one double offset crank shaft extending entirely through said toroidal means and including at each end thereof a pinion gear, a pair of complementary gears fixed with respect to said cylinder cavity, each meshed with one of said pinion gears, auxiliary connecting rods each journaled in one of said main connecting rods and having bearings each receiving one of said offset portions of said crank shaft, the thrust on said pinion gears being the resultant of the thrusts delivered by said auxiliary connecting rods journaled to the crank shaft coupled to said gears, a plurality of cylindrical crank means anchored on said main drive shaft symmetrically with respect to said toroidal means, means including a bearing in said crank means journaling an axial portion of each of said crank shafts coupling said crank shafts to said crank means for providing rotation of said main drive shaft, means for introducing an explosive gaseous mixture into the space in said cylinder cavity intermediate two of said pistons, means for exploding said mixture upon predetermined rotation of said two pistons, and means for exhausting said exploded mixture upon further predetermined rotation of said two pistons.

4. An engine of the type described in claim 3 including a pair of continuous rotary ring bearing members providing a gas seal on the inner wall of said toroidal cylinder cavity intermediate said main connecting rods, and rotatable with respect to each other and said cylinder cavity in response to movement of different ones of said main connecting rods.

5. In a rotary reciprocating engine having means defining a toroidal cylinder cavity, said cavity being continuously slotted along the minimum radial periphery thereof, a gas seal-bearing comprising a pair of annular members each being substantially of an L cross-sectional shape, radial portions thereof extending complementarily within said slotted portion of said cavity means, pressure means for forcing said annular members together, and bearing means interposed between the non-radial portions of each of said annular members and said cavity means.

6. A device of the type described in claim 5 including apertured portions in each of said annular members, and means including each of said apertured portions for transmitting power from within said cylinder cavity to an external utilization device.

7. In a rotary reciprocating engine having means defining a toroidal cylinder cavity, said cavity being continuously slotted along the periphery thereof, a gas seal-bearing comprising a pair of annular members each being substantially of an L cross-sectional shape, radial portions thereof extending complementarily within said slotted portion of said cavity means, pressure means including means secured to said radial portion of one of said members for forcing said annular members together, and rotary bearing means interposed between the non-radial portions of each of said annular members and said cavity means.

8. A rotary reciprocative machine including means providing at least one fixed continuous toroidal cylinder cavity having at least one pair of arcuate double-ended pistons in relatively reciprocative relation disposed therein, a drive shaft, means including a multiple throw crank shaft extending entirely through said toroidal means for imparting relative reciprocative motion to said pistons, means including pinions secured to the ends of said crank shaft cooperating with gears fixed to said toroidal means for deriving continuous rotary motion from said relatively reciprocative motion of said pistons, the thrust on said pinions being the resultant of the thrusts delivered from each pair of cooperating pistons to the crank shaft coupled to said pinions, and means including cylindrical cranks symmetrically disposed on said drive shaft with respect to said toroidal means and journalled to said crank shaft for transmitting said continuous rotary motion to said drive shaft and to said pistons within said fixed cylinder cavity.

9. In an internal combustion engine having means defining a slotted toroidal cylinder cavity having a plurality of double-ended arcuate pistons disposed therein in mutually cooperative rotary reciprocative relation, a plurality of piston arms each extending from different ones of said pistons through said cylinder cavity slot, and two sealing rings journaled separately to the outer faces of said cylinder cavity means, said rings having an L-shaped cross-section and being formed to receive different ones of said piston arms and being movable reciprocally with respect to each other, rotatable with respect to said cavity means, and coacting to provide a gas seal for said slot in said cavity means.

10. A rotary reciprocative machine including means providing at least one fixed continuous toroidal cylinder cavity having at least one pair of arcuate double-ended pistons in relatively reciprocative relation disposed therein, a drive shaft, means including a multiple throw crank shaft extending entirely through said toroidal means for imparting relative reciprocative motion to said pistons, means including pinions secured to the ends of said crank shaft cooperating with gears fixed to said toroidal means for deriving continuous rotary motion from said relatively reciprocative motion of said pistons, the thrust on said pinions being the resultant of the thrusts delivered from each pair of cooperating pistons to the crank shaft coupled to said pinions, and positive mechanically coupled means including cylindrical cranks symmetrically disposed on said drive shaft with respect to said toroidal means and journaled to said crankshaft for transmitting said continuous rotary motion to said drive shaft and to said pistons within said fixed cylinder cavity.

11. An engine according to claim 3 having a plurality of parallel disposed toroidal cylinder cavities each having pistons therein coupled to said main drive shaft.

12. An engine according to claim 3 having a plurality of parallel disposed toroidal cylinder cavities each having pistons therein coupled to said main drive shaft, and means for alternating said mixture explosions in said several cylinder cavities.

13. An engine according to claim 8 including a pair of sealing rings in mutually rotary reciprocative relation sealing said toroidal cylinder cavity, means coupling alternate ones of said pistons to different ones of said rings and means coupling said rings to said crank shaft to provide rotary motion thereof in response to mutually reciprocative motion of adjacent ones of said pistons.

RICHARD L. SNYDER.